United States Patent
Herranz Gracia et al.

(10) Patent No.: US 9,369,016 B2
(45) Date of Patent: Jun. 14, 2016

(54) ROTOR FOR AN ELECTRIC MACHINE COMPRISING RECESSES IN MAGNET POCKETS

(71) Applicant: Robert Bosch GmbH, Stuttgart (DE)

(72) Inventors: Mercedes Herranz Gracia, Tauberbischofsheim (DE); Marcus Alexander, Ludwigsburg (DE); Arndt Kelleter, Ludwigsburg (DE); Nils Gebert, Oehringen (DE); Miguel Ruiz De Larramendi, Ludwigsburg (DE); Patrick Heuser, Stuttgart (DE); Sebastian Tabarelli, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 265 days.

(21) Appl. No.: 14/133,224

(22) Filed: Dec. 18, 2013

(65) Prior Publication Data
US 2014/0167552 A1  Jun. 19, 2014

(30) Foreign Application Priority Data
Dec. 18, 2012 (DE) .......................... 10 2012 223 598

(51) Int. Cl.
*H02K 21/12* (2006.01)
*H02K 1/27* (2006.01)

(52) U.S. Cl.
CPC ............ *H02K 1/276* (2013.01); *H02K 2213/03* (2013.01)

(58) Field of Classification Search
CPC .. H02K 1/276; H02K 1/2766; H02K 2213/03
USPC ............................. 310/156.53, 156.56, 156.83
See application file for complete search history.

(56) References Cited

U.S. PATENT DOCUMENTS

| | | | |
|---|---|---|---|
| 6,657,350 B2 * | 12/2003 | Kimura ................ | H02K 1/276 310/156.53 |
| 7,151,335 B2 | 12/2006 | Tajima et al. | |
| 7,605,510 B2 | 10/2009 | Okuma et al. | |
| 8,957,560 B2 * | 2/2015 | Uchiyama ............ | H02K 1/2766 310/156.56 |
| 2009/0261679 A1 | 10/2009 | Sakai et al. | |
| 2010/0213781 A1 * | 8/2010 | Rahman ............... | H02K 1/2766 310/156.56 |
| 2012/0293033 A1 * | 11/2012 | Hisada .................. | H02K 1/276 310/156.43 |
| 2013/0270949 A1 * | 10/2013 | Gracia ..................... | H02K 1/02 310/152 |
| 2013/0320798 A1 * | 12/2013 | Islam .................... | H02K 1/276 310/156.53 |

FOREIGN PATENT DOCUMENTS

| | | |
|---|---|---|
| EP | 1734638 | 12/2006 |
| EP | 2207253 | 7/2010 |
| EP | 2355306 | 8/2011 |
| EP | 2362525 | 8/2011 |
| WO | 2011033397 | 3/2011 |

* cited by examiner

*Primary Examiner* — Hanh Nguyen
(74) *Attorney, Agent, or Firm* — Michael Best & Friedrich LLP

(57) ABSTRACT

A rotor (1) for an electric machine, in particular a permanently excited synchronous machine. At least one recess (20) is formed on the outer wall (12) of the receiving space (6) and forms a non-magnetizable space (29) adjacent to the lengthwise surface (10) of the permanent magnet (7). Due to this non-magnetizable space (29), iron losses in the stator teeth can be reduced in particular during operation of the electric machine in the field weakening range, which may result in a rise in efficacy of up to 3% for the electric machine.

16 Claims, 2 Drawing Sheets

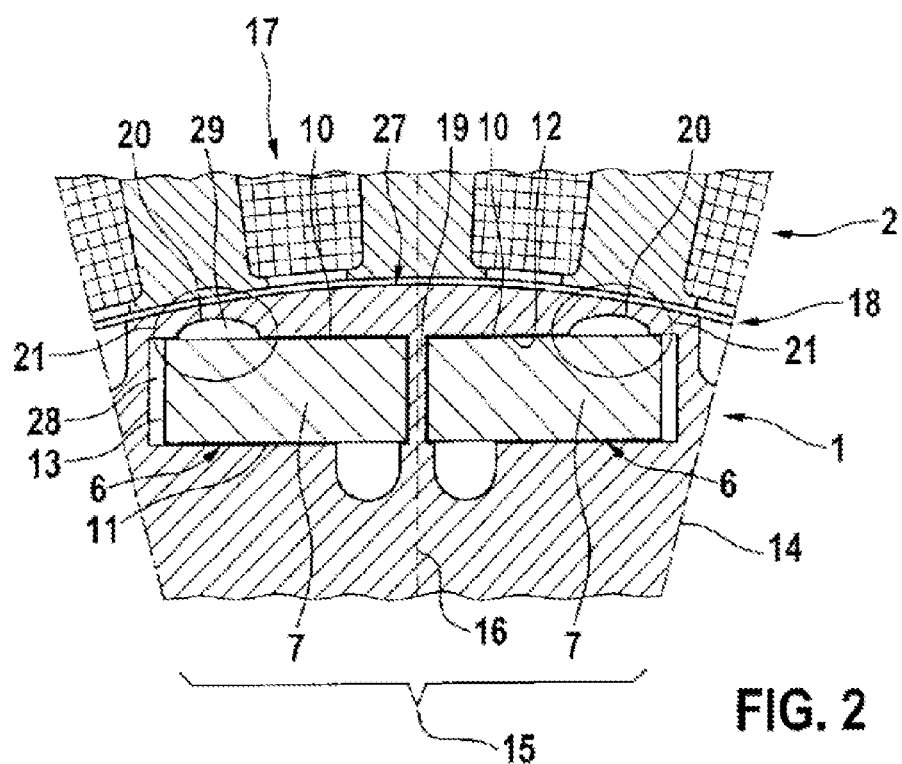
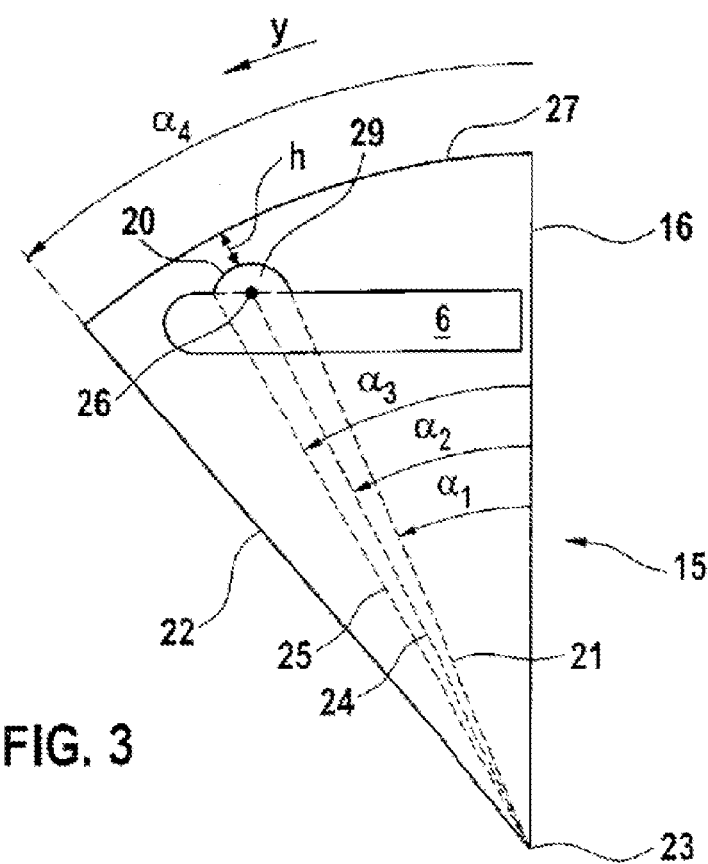

ROTOR FOR AN ELECTRIC MACHINE COMPRISING RECESSES IN MAGNET POCKETS

BACKGROUND OF THE INVENTION

The present invention relates to a rotor for an electric machine and also to an electric machine equipped with such a rotor.

Electric machines can be used for a wide range of purposes as a motor or as a generator. For example, electric synchronous machines with permanent excitation can be used in motor vehicles in order to drive said motor vehicles or in order to regenerate kinetic energy into electric energy when braking. An electric machine for this purpose generally has a rotor and a stator, wherein the rotor can rotate relative to the stator.

With a permanently excited electric machine, permanent magnets are mostly arranged on the rotor. Electromagnets, with the aid of which varying magnetic fields can be generated which alternate with the magnetic fields produced by the permanent magnets such that a torque is generated between the stator and the rotor, are located on the stator.

Since, during the rotation of the rotor, considerable centrifugal forces may act on the permanent magnets arranged on the rotor, these permanent magnets must be securely fastened on or in the rotor by means of suitable design features.

With a frequently used rotor type, a plurality of receiving spaces into which the permanent magnets can be initially inserted during assembly of the rotor and then fixed therein, for example by being glued or pressed in place, are provided within a rotor body. The receiving spaces are also referred to as magnet pockets and are located close to the outer periphery of the rotor body.

The rotor body preferably consists of magnetically soft material, such as iron. For example, the rotor can be formed as a disk set, in which a plurality of magnetic steel sheets are arranged as disks in succession in an axial direction. The magnetic steel sheets can be punched suitably into shape for this purpose, such that appropriate recesses for example are punched out therein and, when the disk set is assembled, form the receiving spaces of the rotor.

An exemplary embodiment of a rotor for an electric machine is described in U.S. Pat. No. 7,151,335 B2.

SUMMARY OF THE INVENTION

A rotor according to embodiments of the present invention enables an electric machine with increased performance potential compared to previous electric machines with preferably simultaneously increased efficacy.

According to an aspect of the invention, a rotor for an electric machine is provided. In cross section, the rotor has a plurality of sectors, which are arranged along a peripheral direction and are each formed with an identical geometry. Here, each of the sectors is formed symmetrically with respect to a center line. Each sector has at least one receiving space, formed in a rotor body, for receiving at least one permanent magnet. At least one permanent magnet is received in such a receiving space and has an elongate shape in cross section. Here, the permanent magnet is received in the receiving space in such a way and has such a magnetization that the permanent magnet bears against an outer wall of the receiving space via a radially outwardly directed lengthwise surface, and magnetic field lines run transversely, preferably perpendicularly, from the lengthwise surface of the permanent magnet to an outer periphery of the rotor. The rotor is characterized in that at least one recess is formed on the outer wall of the receiving space and forms a non-magnetizable space adjacent to the lengthwise surface of the permanent magnet. A "non-magnetizable space" is to be understood here to mean a volume that is filled with a material, such as air, adhesive or resin, which, in contrast to a magnetically soft material otherwise used for the rotor, such as iron, cannot be magnetized or can hardly be magnetized.

Ideas concerning the rotor proposed herein or embodiments thereof can be considered inter alia as being based on the findings described below.

With the rotor proposed here, the geometry of receiving spaces, serving as magnet pockets, in a rotor body is modified in such a way that a small gap is formed between the outwardly directed lengthwise surface of one of the received permanent magnets and an outer wall, arranged opposite, of the receiving space.

In conventional rotors, the receiving spaces and the permanent magnets were generally formed in a manner complementary to one another in terms of their geometry in such a way that the outwardly directed lengthwise surface of the permanent magnet bears over its entire area against the outer wall arranged opposite. The permanent magnets could thus be held reliably within the receiving spaces, in particular under the considerable centrifugal forces occurring during operation.

It has now been found however that firstly such a bearing of the outer face of the magnet over the entire area against the wall of the receiving space arranged opposite is not absolutely necessary for a reliable hold and secondly that the provision of small air gaps between the permanent magnets and walls of the outer spaces can have an advantageous effect on the properties of the rotor.

In particular, it has been found that, during operation of an electric machine in the field weakening range, that is to say at high rotation speeds, the iron losses in the stator of the electric machine dominate the total machine losses. These iron losses are caused in particular by high-frequency changes of the magnetic flux densities in the metal sheets forming the stator. A power loss is in this case approximately proportional to the square of the frequency. A spectral composition of the flux density in the stator metal sheets is significantly influenced by the magnetic conductivity of the rotating rotor, said conductivity alternating from the viewpoint of the stator. Slight changes in the geometry of the metal sheets forming the rotor may thus have considerable effects in respect of the losses in the stator.

Due to the recesses provided on outer walls of receiving spaces or, in other words, due to the additional recesses on an upper edge of a magnet pocket in the rotor, as are proposed herein, a small non-magnetizable space, formed for example as an air space, can be produced between the received permanent magnets and adjacent regions of the rotor metal sheets. The air gap field of the electric machine can thus be changed, such that the iron losses in the stator teeth are reduced. The recesses on the magnet pockets can in this case reduce flux density fluctuations in the stator with only little effect on the mean torque and the power of the electric machine. Introduced at the correct points, such recesses lead to a reduction of the iron losses in the field weakening region, which may result in a rise in efficacy of up to 3% for the electric machine.

The at least one recess to be provided in the receiving spaces may preferably be arranged in the receiving spaces closer to an edge of the respective sector than to the center line thereof. It has been found that a non-magnetizable space formed by such a recess particularly advantageously affects the iron losses in the electric machine when it is arranged in the vicinity of the lateral edge of one of the sectors of the rotor, in particular where the permanent magnet arranged in the receiving space comes particularly close to the outer periphery of the rotor.

Whereas one or more receiving spaces is/are to be formed in each of the sectors of the rotor, it may be advantageous to form an even number, that is to say for example two, four, six, etc., of recesses in each sector. Should merely a single receiving space be formed in a sector, two or more recesses can be formed on this receiving space, wherein one or more recesses may be formed on a lateral edge of the receiving space. If more than one receiving space is formed in a sector, respective recesses can be formed for example on each of the receiving spaces formed in the sector.

In particular, it has been found to be advantageous if the plurality of recesses formed in a sector are arranged symmetrically with respect to a center axis of the sector.

In order to be able to describe hereinafter geometries and designs, which have been found to be particularly advantageous, of the recesses to be provided in the receiving spaces, the following dimensions or angles are defined: the rotor is divided in cross section into a plurality of sectors. Each sector extends here over an angular range of $2*\alpha_4$. In other words the angle between the center line of a sector and its outer delimiting line has a value of $\alpha_4$. A line between an edge of the recess provided in a receiving space, said edge being arranged outwardly in the peripheral direction, and the center point of the rotor is arranged at an angle of $\alpha_3$ to the center line of the sector. A line between an edge of the recess arranged inwardly in the peripheral direction and the center point of the rotor is arranged at an angle of $\alpha_1$ to the center line of the sector. A line between the center point of the recess and the center point of the rotor is arranged at an angle of $\alpha_2$ to the center line of the rotor.

In an advantageous embodiment, the rotor has a geometry such that a ratio of $\alpha_2$ to $\alpha_4$, that is to say a quotient $\alpha_2/\alpha_4$, lies in the range from 0.3 to 0.9.

Furthermore, the geometry of the rotor may advantageously be selected in such a way that a ratio of the difference of $\alpha_3$ and $\alpha_1$ to $\alpha_4$, that is to say a quotient of $(\alpha_3-\alpha_1)/\alpha_4$, lies in the range from 0.05 to 0.5.

It has also been found that an advantageous effect can then be achieved if a minimum web height between the recess provided in the receiving space and an outer periphery of the rotor lies in the range from 0.4 to 2.5 mm.

It is noted that possible advantages and features of embodiments of the invention are sometimes described herein with reference to a rotor according to the invention and sometimes with reference to an electric machine according to the invention. A person skilled in the art will be aware that the described features can be suitably combined with one another or exchanged for one another in order to thus obtain further embodiments and potentially synergy effects.

BRIEF DESCRIPTION OF THE DRAWINGS

Embodiments of the present invention will be described hereinafter with reference to the accompanying drawings, wherein neither the description nor the drawings are to be considered as having a limiting effect on the invention.

FIG. 2 shows a cross section of a sector of a rotor according to the invention and an adjacent region of a stator of an electric machine.

FIG. 3 shows one half of a sector of a rotor according to the invention in order to illustrate defined angular regions.

Figure 1:
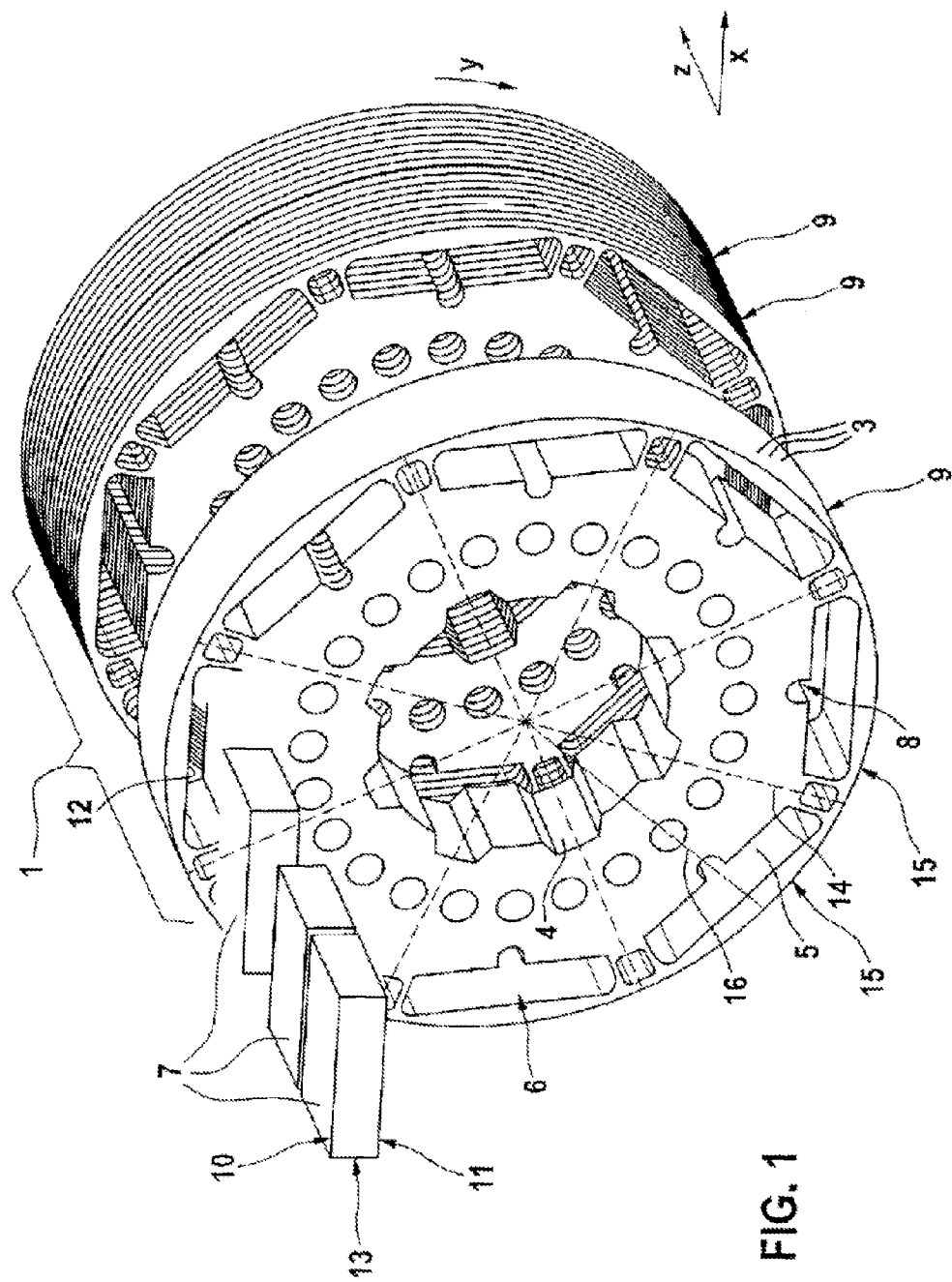
FIG. 1 shows a perspective illustration of components of a rotor of an electric machine.

The figures are merely schematic and are not shown to scale.

DETAILED DESCRIPTION

FIG. 1 shows a rotor 1 of a permanently excited electric synchronous machine. The rotor 1 is composed of a plurality of disk sets 9. Each disk set 9 consists of a multiplicity of metal sheets 3, which are arranged in succession in the axial direction z of the rotor. Partial regions 4, 5 are punched out from the metal sheets 3. For example, openings 4 are punched out in the center of the metal sheets 3 and a shaft of the electric machine may be arranged through said openings. In edge regions of the metal sheets 3, approximately rectangular regions 5 are punched out and serve to form receiving spaces 6 for receiving permanent magnets 7, which are likewise rectangular. The permanent magnets 7 have an elongate shape in cross section with an outwardly directed lengthwise surface 10, an inwardly directed lengthwise surface 11, and a narrow end face 13. The magnets 7 bear against an outer wall 12 of the receiving space 6 over the entire area via their outwardly directed lengthwise surface 10. On the opposite lengthwise surface 11, a suitable fastening device (not illustrated) may be provided in a further recess 8 in the disk set 9 in order to bias the magnets 7 radially outwardly, and therefore via their outwardly directed lengthwise surface 10, against the outer wall 12.

As illustrated by the dashed lines 14 in FIG. 1, the rotor 1 can be imagined in cross section as being divided into a plurality of sectors of a circle 15. The line 14 corresponds here to the magnetic q-axis. The sectors 15 are not separated from one another here by physical features, but rather represent sub-units shaped as sectors of a circle, from which the entire rotor 1 can be considered as being assembled, wherein the sectors 15 are arranged along the periphery of the rotor, offset in the y-direction. All sectors here have an identical geometry. Furthermore, the sectors 15 are each formed symmetrically with respect to a center line 16 (only illustrated once in FIG. 1). The permanent magnet or permanent magnets 7 is/are arranged here in a sector 15 in such a way that what is known as the magnetic d-axis coincides with the center line 16.

In FIG. 2, a partial region of one of the sectors 15 of a rotor 1 and also an adjoining region of a stator 2 is illustrated in cross section. The stator 2, along its periphery, has a plurality of electromagnets 17 with stator teeth arranged therebetween. A narrow air gap 18 is formed between an inner periphery of the stator 2 and an outer periphery 27 of the rotor 1. In the illustrated exemplary embodiment, two receiving spaces 6 formed side by side are provided in the sector 15 of the rotor 1 and are separated from one another by a thin wall 19 for reasons of stability. The two receiving spaces are substantially rectangular in cross section, such that permanent magnets 7, which are likewise rectangular and elongate in cross section, can be received therein.

The outwardly directed lengthwise surfaces 10 of the permanent magnets 7 bear here over large areas directly against an outer wall 12 of the respective receiving space 6. A permanent magnet 7 received in a receiving space 6 is formed here in terms of its geometry and magnetization in such a way that a magnetic field is produced such that magnetic field lines run from the outwardly directed lengthwise surface 10 to the outer periphery 27 of the rotor and from there to the stator 2, wherein substantially no field lines however start from the end face 13 of the permanent magnets 7 and run through the adjacent clearance 28.

In an edge region 21 of the receiving space 6, in each case a recess 20 is formed however on the outer wall 12 of one of the receiving spaces 6. In this region 21, the shape of the magnet 7 is no longer complementary to the shape of the receiving space 6, and therefore a small non-magnetizable space 29 is formed at the recess 20. Here, field lines originating transversely from the outwardly directed lengthwise surface 10 intersect the non-magnetizable space 29 produced in this way.

The non-magnetizable space 29 formed by the recess 20 can significantly reduce the iron losses occurring in the stator 2 with rotation of the rotor 1 during operation of the electric machine and can thus contribute to an increased efficacy of the electric machine, without however significantly worsening the mean torque and the power of the electric machine.

In the exemplary embodiment illustrated in FIG. 2, the two permanent magnets 7 and in particular the recesses 20 provided in the respective receiving spaces 6 are arranged symmetrically with respect to the center line 16 of the sector 15. In FIG. 3, a plurality of angles are illustrated in order to clarify a preferred geometric embodiment and arrangement of the receiving space 6 and the recess 20 within one half of an illustrated sector 15 of the rotor. The angle between the center line 16 and a lateral delimiting line 22 of the sector 15, which corresponds to the dashed lines 14 in FIG. 1, is denoted as $\alpha_4$. The angle between the center line 16 and a line 21, which connects an edge of the recess 20 arranged inwardly in the peripheral direction y to the center point 23 of the rotor, is denoted as $\alpha_1$. The angle between the center line 16 and a line 25, which connects an edge of the recess 20 arranged outwardly in the peripheral direction to the center point 23 of the rotor, is denoted as $\alpha_3$. The angle between the center line 16 and a line 24, which connects the center point 26 of the recess 20 and the center point of the rotor 23, is denoted as $\alpha_2$. A minimum distance between an edge of the recess 20 and the outer periphery 27 of the rotor is denoted as the web height h.

Particularly advantageous effects as a result of the provision of recesses 20 in the receiving spaces 6 have been observed when the center point of the recess has been positioned in such a way that $\alpha_2/\alpha_4$ lies in the range from 0.3 to 0.9. A maximum width of the recess 20 should be selected here where possible such that $(\alpha_3-\alpha_1)/\alpha_4$ lies in the range from 0.05 to 0.5. The minimum web height h should preferably lie here in the range from 0.4 to 2.5 mm.

It is lastly noted that the recesses 20 in cross section are formed in a wide variety of shapes, such as in a rectangular, circular or elliptical shape, in the shape of slots, or similarly. The provision according to the invention of recesses 20 in the receiving spaces 6 can be advantageous for electric machines having different hole numbers q, for example q=0.5, q=1, q=1.5, q=2 or q=3, in the stator.

What is claimed is:

1. A rotor (1) for an electric machine, the rotor (1) in cross section having a plurality of sectors (15), which are arranged along a peripheral direction (y) and are each formed with identical geometry, each sector (15) being formed symmetrically with respect to a radial center line (16) and extending over an angular range of 2*$\alpha_4$, and each sector (15) having a pair of adjacent receiving spaces (6) which are spaced from one another and arranged on opposite sides of the radial center line (16), each receiving space (6) receiving a respective permanent magnet (7), which is elongate in cross section, in such a way that each respective permanent magnet (7) bears against an outer wall (12) of the receiving space (6) via a radially outwardly directed lengthwise surface (10), the outer walls (12) of the receiving spaces (6) being collinear, and wherein magnetic field lines run transversely from the outwardly directed lengthwise surface (10) of the permanent magnet (7) to an outer periphery (27) of the rotor (1), characterized in that
at least one recess (20) is formed on the outer wall (12) of each receiving space (6) and forms a non-magnetizable space (29) adjacent to the outwardly directed lengthwise surface (10) of the permanent magnet (7),
a line (25) between an edge of the at least one recess (20) arranged outwardly in the peripheral direction and the center point (23) of the rotor (1) being arranged at an angle of $\alpha_3$ to the radial center line (16) of the sector (15),
a line (21) between an edge of the recess (20) arranged inwardly in the peripheral direction and the center point (23) of the rotor (1) being arranged at an angle of $\alpha_1$ to the radial center line (16) of the sector (15), and
a line (24) between a center point (26) of the at least one recess (20) and the center point (23) of the rotor (1) being arranged at an angle of $\alpha_2$ to the radial center line (16) of the sector (15).

2. The rotor according to claim 1, wherein the at least one recess (20) is arranged closer to an edge (22) of a sector (15) than to the radial center line (16) thereof.

3. The rotor according to claim 2, wherein an even number of recesses (20) is formed in each sector (15).

4. The rotor according to claim 3, wherein a plurality of recesses (20) are formed in each sector (15) and the recesses (20) in a sector (15) are arranged symmetrically with respect to the radial center line (16) of the sector (15).

5. The rotor according to claim 4, wherein a ratio of $\alpha_2$ to $\alpha_4$ lies in the range from 0.3 to 0.9.

6. The rotor according to claim 5, wherein a ratio of the difference of $\alpha_3$ and $\alpha_1$ to $\alpha_4$ lies in the range from 0.05 to 0.5.

7. The rotor according to claim 6, wherein a minimum web height h between the recess (20) and an outer periphery (27) of the rotor (1) lies in the range from 0.4 to 2.5 mm.

8. The rotor according to claim 7, wherein the rotor (1) is formed with disk sets (9) formed from a plurality of disks (3) arranged in succession in an axial direction (z).

9. The rotor according to claim 1, wherein an even number of recesses (20) is formed in each sector (15).

10. The rotor according to claim 1, wherein a plurality of recesses (20) are formed in each sector (15) and the recesses (20) in a sector (15) are arranged symmetrically with respect to the radial center line (16) of the sector (15).

11. The rotor according to claim 1, wherein a ratio of $\alpha_2$ to $\alpha_4$ lies in the range from 0.3 to 0.9.

12. The rotor according to claim 1, wherein a ratio of the difference of $\alpha_3$ and $\alpha_1$ to $\alpha_4$ lies in the range from 0.05 to 0.5.

13. The rotor according to claim 1, wherein a minimum web height h between the recess (20) and an outer periphery (27) of the rotor (1) lies in the range from 0.4 to 2.5 mm.

14. The rotor according to claim 1, wherein the rotor (1) is formed with disk sets (9) formed from a plurality of disks (3) arranged in succession in an axial direction (z).

15. An electric machine comprising a rotor (1) according to claim 1.

16. The rotor according to claim 1, wherein the at least one recess (20) is elliptically shaped.

* * * * *